US008703027B2

(12) United States Patent
Mao

(10) Patent No.: US 8,703,027 B2
(45) Date of Patent: Apr. 22, 2014

(54) MAKING CARBON ARTICLES FROM COATED PARTICLES

(75) Inventor: Zhenhua Mao, Ponca City, OK (US)

(73) Assignee: Phillips 66 Company, Houston, TX (US)

(*) Notice: Subject to any disclaimer, the term of this patent is extended or adjusted under 35 U.S.C. 154(b) by 295 days.

(21) Appl. No.: 13/285,391

(22) Filed: Oct. 31, 2011

(65) Prior Publication Data
US 2012/0119398 A1 May 17, 2012

Related U.S. Application Data

(60) Provisional application No. 61/414,714, filed on Nov. 17, 2010.

(51) Int. Cl.
*C01B 31/02* (2006.01)

(52) U.S. Cl.
USPC ....... 264/29.3; 264/29.1; 264/29.5; 264/29.6; 264/29.7; 427/226; 427/227; 427/228

(58) Field of Classification Search
CPC ...... B29C 43/006; B29C 67/02; B29C 67/04; C01B 31/02; C04B 35/521; C04B 35/532; C04B 35/528; C04B 41/0072; C04B 41/0081; C04B 41/45; C04B 41/4535; C04B 41/4545; C04B 41/501
USPC .................... 264/29.1, 29.3, 29.5, 29.6, 29.7; 427/226, 227, 228
See application file for complete search history.

(56) References Cited

U.S. PATENT DOCUMENTS

| | | | |
|---|---|---|---|
| 2,270,199 A | 1/1942 | Thrune | |
| 2,365,055 A | 12/1944 | Cole | |
| 3,009,863 A | 11/1961 | Angevine | |
| 3,166,615 A | 1/1965 | Farrell | |
| 3,346,678 A | 10/1967 | Ohlgren | |
| 3,393,085 A | 7/1968 | Howard, et al. | |
| 3,891,574 A | 6/1975 | Kobayashi et al. | |
| 4,025,689 A | 5/1977 | Kobayashi et al. | |
| 4,985,184 A * | 1/1991 | Takahashi et al. | 264/29.4 |
| 2001/0014422 A1 * | 8/2001 | Omaru et al. | 429/231.1 |
| 2005/0247914 A1 * | 11/2005 | Mao et al. | 252/500 |
| 2007/0020458 A1 * | 1/2007 | Su et al. | 428/408 |
| 2008/0248400 A1 * | 10/2008 | Hwang et al. | 429/341 |
| 2010/0285366 A1 * | 11/2010 | Endoh | 429/231.95 |

FOREIGN PATENT DOCUMENTS

| | | |
|---|---|---|
| EP | 0861804 | 9/1998 |
| EP | 2280437 | 2/2011 |
| JP | 11140681 | 5/1999 |
| JP | 2000003708 | 1/2000 |

OTHER PUBLICATIONS http://www.n-kokuen.com/e/2/index.htm (retrieved Oct. 29, 2013).*
PCT Notification of Transmittal of the International Search Report and the Written Opinion of the International Searching Authority, or the Declaration, International Application No. PCT/US2011/058562, International Filing Date: Oct. 31, 2011, 12 pages.

* cited by examiner

*Primary Examiner* — Timothy Kennedy
(74) *Attorney, Agent, or Firm* — Phillips 66 Company

(57) ABSTRACT

Methods and compositions relate to manufacturing a carbonaceous article from particles that have pitch coatings. Heating the particles that are formed into a shape of the article carbonizes the pitch coatings. The particles interconnect with one another due to being formed into the shape of the article and are fixed together where the pitch coatings along adjoined ones of the particles contact one another and are carbonized to create the article.

14 Claims, 2 Drawing Sheets

MAKING CARBON ARTICLES FROM COATED PARTICLES

CROSS-REFERENCE TO RELATED APPLICATIONS

This application is a non-provisional application which claims the benefit of and priority to U.S. Provisional Application Ser. No. 61/414,714 filed Nov. 17, 2010, entitled "Making Carton Articles from Coated Particles," which is hereby incorporated by reference in its entirety.

STATEMENT REGARDING FEDERALLY SPONSORED RESEARCH OR DEVELOPMENT

None

FIELD OF THE INVENTION

Embodiments of the invention relate to carbonaceous articles and methods of manufacturing the carbonaceous articles.

BACKGROUND OF THE INVENTION

Carbonaceous articles often define such objects as mechanical parts, filtration matrices, absorbent material or catalyst supports. Properties of the carbonaceous articles include porosity, weight, strength, temperature stability or inertness suitable for such applications. For example, solid carbon or carbon foam may form the carbonaceous articles.

However, prior techniques utilized to make the carbonaceous articles with the properties as desired require expensive specialty precursors and complicated process steps. Difficulty in controlling precise operating conditions throughout such techniques limits ability to achieve the properties desired. In addition, previous processes employed to produce the carbon foam yield uneconomical small batches with insufficient quantities for some applications.

A previous approach for making the articles involves several steps including a) indiscriminate mixing of binder pitch and carbon particles, b) forming the articles' shapes, c) baking resulting preforms of the articles, d) impregnating different pitch into the preforms, and e) carbonizing the binder and impregnating pitches. Insufficient carbon yield as a result of the binder pitch in the preforms necessitates the impregnating in order to achieve desired density of the articles. With regard to process undesirability, baking and impregnating steps require precise control of temperature to avoid pitch flowing and foaming. The carbonizing also causes weight loss and volume change resulting in cracks within the articles, deformation of the shapes and defects due to the binder pitch content and non-uniformity in composition of the preform.

Therefore, a need exists for carbonaceous articles and methods of manufacturing the carbonaceous articles.

BRIEF SUMMARY OF THE DISCLOSURE

In one embodiment, a method of manufacturing an article includes forming a shape of the article from particles having pitch coatings and that are separated from liquid of a suspension and provided by precipitation of the pitch coatings onto solid cores dispersed in the suspension during the precipitation. Heating the particles formed into the shape of the article to above 400° C. carbonizes the pitch coatings. The particles interconnect with one another upon being formed into the shape of the article and are fixed together where the pitch coatings along adjoined ones of the particles contact one another and are carbonized to create the article.

According to one embodiment, a method of manufacturing an article includes pressing a powder formed of particles that have a coating of pitch into a shape of the article with the particles interconnected from contact with one another under pressure. Heating the powder pressed into the shape of the article to above 400° C. carbonizes the pitch. The pitch from adjoined ones of the particles thus carbonizes to provide the article with a cohesive network of carbonized material.

For one embodiment, a method of manufacturing an article includes mixing a solution of pitch dissolved in a solvent with a suspension of solid particulate such that decrease in concentration of the pitch within a resulting mixture relative to the solution facilitates precipitation of the pitch onto the solid particulate. The method further includes separating particles of the solid particulate coated with the pitch from liquid of the mixture and forming the particles separated from the liquid into a shape of the article with the particles cohered to one another by the pitch of the particles. Carbonizing the pitch of the particles upon heating the particles formed into the shape of the article to above 400° C. provides the article with desired mechanical strength and composition due to carbonization of the pitch interconnecting the particles.

BRIEF DESCRIPTION OF THE DRAWINGS

A more complete understanding of the present invention and benefits thereof may be acquired by referring to the following description taken in conjunction with the accompanying drawings.

DETAILED DESCRIPTION

Figure 1:
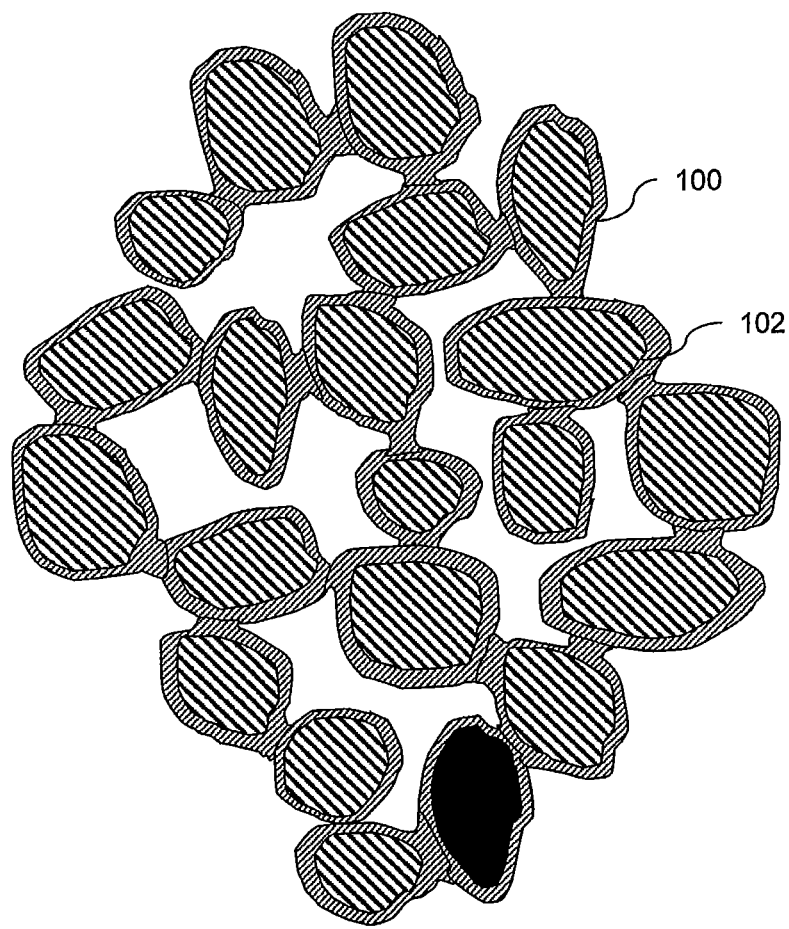
FIG. 1 is a cross-sectional schematic representation of an article during manufacturing of the article formed with coated particles, according to one embodiment of the invention.

Embodiments of the invention relate to manufacturing a carbonaceous article from particles that have pitch coatings. Heating the particles that are formed into a shape of the article carbonizes the pitch coatings. The particles interconnect with one another due to being formed into the shape of the article and are fixed together where the pitch coatings along adjoined ones of the particles contact one another and are carbonized to create the article.

The articles may include open void spaces and are suitable for many applications such as filtration beds for fluid purification, catalyst supports, shock absorbers, sorbent and light weight mechanical parts. Since carbon is inert in chemically aggressive environments such as in strong basic and acidic liquids and gases and is also stable at high temperatures, the articles manufactured as described herein include porous carbon articles with uniform pore distribution and desirable pore size useful as filters and porous membranes for gas and liquid separation in many industry applications. By contrast, organic and inorganic filters and membranes such as metal and ceramic membranes have certain limitations including limited temperature range and solution acidity and are not cost efficient because of expensive precursors and complicated processing steps and controls. Unlike fabrication of inorganic and metal articles that melt and deform if sintering temperature is not controlled properly, articles made from the particles sinter at above 400° C. without melting or deformation of the shape because solid cores of carbon, for example, do not melt at any temperature and the pitch coatings on the solid cores initially hold the particles together and turn into carbon themselves at above 400° C.

In some embodiments, the particles form a powder produced by applying the pitch coatings to solid cores. The solid cores provide support for the pitch coatings without decomposing or deforming in shape at temperatures below a softening point of the pitch coatings. Methods such as milling, crushing or grinding can provide the solid cores dimensioned for some embodiments to provide the particles with an average particle size that is smaller than 1 millimeter (mm) or smaller than 0.5 mm. Composition of the solid cores depends on desired final composition and/or porosity of the article given a particular application.

Examples of the solid cores include carbonaceous material such as cokes, graphite or compositions which form graphite upon heating to graphitization temperatures of 2200° C. or higher. For some embodiments, compositions that are not carbonaceous may make up the solid cores onto which the pitch coatings are deposited and may remain within the article or be removed during manufacturing of the article to leave resulting pores and the pitch coatings that are carbonized. Such removal of the solid cores may include thermal decomposition or chemical dissolution of the solid cores.

Suitable examples of the solid cores that enable the removal include lithium carbonate, zinc, aluminum and polymers, such as polyethylene. After carbonizing the pitch coatings as described herein, the zinc, the lithium carbonate, or the aluminum for example may dissolve with treatment in acidic or basic solutions. The polyethylene provides an example of the solid cores that decompose during carbonization of the pitch coatings and at a temperature above the softening point of the pitch coatings.

In some embodiments, the article contains limited amounts of elements other than carbon due to carbonization of the pitch coatings and use of the carbonaceous material as the solid cores or the removal of the solid cores. The article manufactured as described herein may thus after the carbonization contain at least 95% carbon by weight, at least 98% carbon by weight, or at least 99% carbon by weight and have porosity between about 1% and about 95% or less than about 10%. Carbon yields greater than 85% or greater than 90% from the pitch coatings upon subsequent heating of the article and uniformity of the pitch coatings facilitate in controlling the porosity and enable making the articles with at least limited pores if wanted.

The pitch coatings cover substantially all, or all, of an outer surface of each of the solid cores. Level of the pitch coatings disposed on the solid cores ranges from 1% to 80% by weight or from 5% to 50% by weight. The level of the pitch coatings on the solid cores facilitates controlling porosity of the article since the level of the pitch coatings can be adjusted with coating conditions and the porosity of the article is based at least in part on the level of the pitch coatings given teachings herein. The particle size and distribution of the solid cores also influences porosity and pore size of the article that is manufactured. Carbon content of the pitch coatings at deposition and prior to heating in order to carbonize the pitch coatings exceeds 50%, 60% or 70%. The softening point of the pitch coatings refers to a melting point, which is higher than 200° C. or higher than 250° C.

In some embodiments, a coating process forms the coatings utilizing a pitch, such as a petroleum pitch or coal tar pitch, dissolved in a suitable solvent. Suitable solvents for dissolving the pitch include for example and without limitation, benzene, toluene, xylene, quinoline, tetrahydrofuran, naphthalene, acetone, cyclohexane, tetrahydronaphthalene, ether, water and methyl-pyrrolidinone. When petroleum or coal tar pitch is used, solvents such as toluene, xylene, quinoline, tetrahydrofuran, tetrahydronapthalene, or naphthalene are suitable. The ratio of the solvent(s) to the pitch and temperature of a resulting pitch solution are controlled so that the pitch completely or almost completely dissolves into the solvent. In some embodiments, the solvent to pitch ratio in the solution is less than about 4, less than about 3, less than about 2, or less than about 1. The coating process further includes mixing of the solid cores in a liquid and heating a resulting suspension to a temperature of from about 20° to about 200° C. Once the pitch solution is then introduced to the suspension, at least a portion of the pitch precipitates onto the solid cores to form the pitch coatings due to dilution of the pitch and/or temperature reduction. Separation of solids from liquids recovers the particles to be formed into the article.

Once the particles are prepared, generating a desired shape and size of the article relies on forming physical attributes of the article from the particles. Such forming of the shape may occur prior to any heating of the particles resulting in carbonization of the pitch coatings. One of various approaches to the forming of the shape includes molding, such as extruding or casting of the particles.

For some embodiments, compression of the particles during the molding may press the particles into the desired shape, such as a plate, rod or disk, which defines the article. The molding may apply at least 100 kilograms per square centimeter of pressure to the particles. In an extrusion process, pushing or drawing the particles via pressure differential through a die with corresponding cross-section interconnects the particles with the desired shape of the article. In some embodiments, performing the molding at elevated temperatures (e.g., above the softening point of the pitch coatings) and/or blending of additives, such as solvent for the pitch coatings, with the particles during the molding facilitates the forming of the particles into the desired shape in some embodiments. With regard to the casting, the particles fill a mold or die defining a hollow cavity with the desired shape of the article and in order to provide interconnection of the particles may be pressed together and/or allowed to solidify by cooling after heating or solvent evaporation upon introducing the solvent for the pitch coatings.

In some embodiments, manufacturing of the article from the particles includes mixing the particles and an organic polymer solution to form a mixture, forming the mixture into a shape of the article by extrusion, pressure molding or tap casting and heating the mixture formed into the shape to above 50° C. to evaporate solvent of the organic polymer solution followed by heating to above 400° C. under inert gas atmosphere to decompose organic polymers from the organic polymer solution and carbonize the pitch coatings. The organic polymer solution facilitates binding together of the particles during the manufacturing of the article. Examples of the organic polymers that are suitable to act as facilitating binder include polyvinyl alcohols, carboxy methyl cellulose, polystyrene, polyvinyl acetate, polymethyl methacrylate, polyamides, fluoropolymers and polyacrylonitrile. These polymeric compounds decomposes at above 400° C. and leave only carbon residual of limited quantity (e.g., less than about 5% or less than about 10% of the article by weight). The solvent dissolves the organic polymers selected and may be selected from water and other organic solvents. Amount of organic polymer ranges from 1% to 10% by total solid weight, depending on viscosity of the organic polymer solution.

The particles due to being formed into the shape of the article interconnect with one another where the pitch coatings along adjoined ones of the particles contact one another. In some embodiments, the pitch coatings provide all cohesion of the particles without relying on adding binder material to the particles. The article may therefore consist of the particles that are formed and carbonized into the article or consist essentially of the particles that are formed and carbonized into the article.

After the particles are formed into the desired shape, heating the particles in a furnace in inert gas, such as nitrogen gas, achieves the carbonization. The carbonization refers to a thermal treatment that functions primarily to increase a carbon/hydrogen ratio of the particles. In some embodiments, the carbonization of the particles is carried out from about 0.1 hours to about 2 hours in an inert atmosphere and at a temperature of at least 400° C., from about 600° C. to about 1400° C., from about 700° C. to about 1300° C., or from about 750° C. to about 1200° C. Examples of gases making up the inert atmosphere include nitrogen, argon, helium, carbon dioxide, carbon monoxide, hydrogen or combinations thereof. For example, the particles formed into the shape of the article and then thermally reacted in the inert atmosphere to at least 650° C. may create the article. In some embodiments, the carbonization reaches a sufficient temperature (e.g., greater than 2000° C.) to graphitize the particles.

Applications utilizing the article manufactured according to cost efficient foregoing techniques benefit from chemical inertness, temperature stability and ability to tailor reproducible properties of the article including mechanical strength, porosity and pores-size. One example utilizes the article derived from extrusion of the particles as a support onto which catalyst compositions are deposited. For one embodiment, passing a fluid stream in contact with the article that forms one of a filter and a sorbent removes contaminates from the fluid stream. Use of the article as a filtration membrane enables selective size pass-through of particulate, such as calcium carbonate employed as carbon dioxide sorbent material, based on the pore size and porosity of the article. With respect to regeneration of sorbent or catalyst compositions by heating, passing electric current through the article provides efficient heating of any media contacting the article without wasting energy to heat surrounding areas with fluids, such as steam.

FIG. 1 shows a cross-section view through part of an article during manufacturing of the article after particles having pitch coatings 100 and solid cores 102 are formed into a shape to interconnect the particles and prior to carbonization. As illustrated, void space between the particles generated with the forming and prior to the carbonizing contributes to porosity of the article. Amount of pressure applied during the forming of the particles into the shape along with shape and size of the particles can influence density of the article and volume of the void space.

Figure 2:
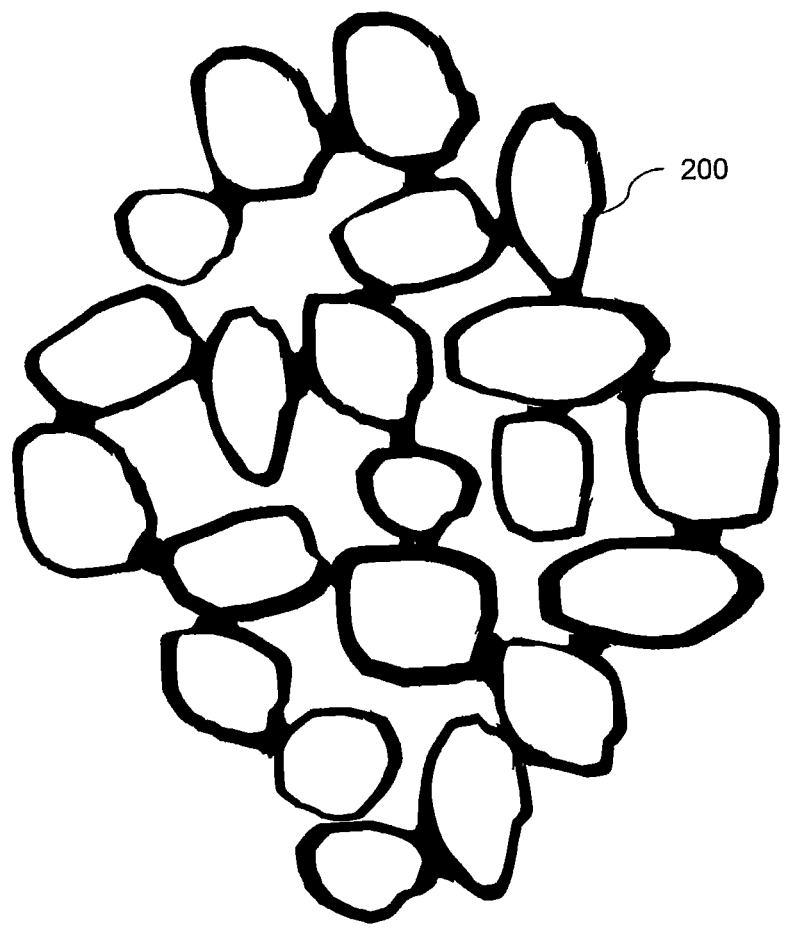
FIG. 2 is a cross-sectional schematic depiction of a carbonaceous network formed by removing cores from the coated particles, according to one embodiment of the invention.

FIG. 2 illustrates a cross-section view through part of a carbonaceous network 200 of an article formed as described herein by removing cores from coated particles. Removal of the cores occurs after the particles are formed into a shape to interconnect the particles. Only coatings from the particles remain within the article and are carbonized to create the network 200.

The following examples of certain embodiments of the invention are given. Each example is provided by way of explanation of the invention, one of many embodiments of the invention, and the following examples should not be read to limit, or define, the scope of the invention.

Example 1

A calcined petroleum coke powder having an average particle size of 8 microns and calcined at 850° C. was coated with 15% pitch as follows. A pitch solution was formed by dissolving 34 grams of a petroleum pitch in 25 grams of xylene. A suspension was prepared by mixing 20 grams of the coke powder with 130 grams of xylene. Both the pitch solution and the suspension were heated to the boiling point and then mixed together. The resulting mixture was continuously agitated at the boiling point for five minutes and subsequently cooled to ambient temperature (~23° C.). Solid particles were separated from the mixture by filtration, washed with xylene, and then dried at 100° C. under vacuum for two hours. A resulting dry solid powder of pitch-coated coke particles weighed 23.0 grams, giving the pitch coating level of 15%.

To form an article shaped as a disk, 4 grams of the pitch-coated coke particles were poured into a press die (1.25 inch in diameter) and pressed under the force of 15 tons. The disk was then placed in a furnace and heated in nitrogen atmosphere at rates of 1° C./minute to 450° C. maintained for 4 hours and thereafter 5° C./minute to 1000° C. held for 2 hours. Subsequently, the furnace was cooled to ambient temperature. The disk weighed 3.82 grams after the heating and had a diameter that remained about 1.25 inches. Thickness of the disk after the heating was measured to be 4.2 millimeter (mm). Thus, the density of the disk was calculated to be 1.15 grams per cubic centimeter (g/cc). Because the coke particle and carbonized pitch coating have a density close to 2 g/cc, the porosity of the disk was about 43%. However, the disk had strong mechanic strength. As depicted in FIG. 1, scanning electron microscopy images of the disk showed the disk had open void space among inter-connected particles and that the particles regardless of size were inter-connected at edges.

Example 2

Milled lithium carbonate was produced by ball-milling 15 grams of lithium carbonate ($Li_2CO_3$) with 25 grams of xylene for 30 minutes. Then, the milled lithium carbonate was coated with 28% pitch in a same way as the pitch was coated onto the coke powder in Example 1. Further, 4 grams of resulting pitch-coated lithium carbonate powder was pressed into a disk in a same way as the article was formed in Example 1.

The resulting disk was heated similarly as Example 1 but with a final carbonization temperature of 710° C. instead of 1000° C. After carbonization, the disk was placed in a dilute nitric acid solution for three days so that lithium carbonate was dissolved and leached out to leave a porous carbon-network forming the disk. The disk after being heated and dried weighed about 0.85 grams, giving a density of about 0.2 g/cc and porosity of about 90%. Even though the disk is porous, the disk still had mechanic strength. As represented with FIG. 2, scanning electron microscopy images of a microstructure of the disk showed a continuous network that is porous and similar to some carbon foams made by complicated processes and specialty precursors. Examples 1 and 2 demonstrated that use of pitch-coated particles enables manufacturing carbonaceous articles with controllable porosity and pore size.

Example 3

To prepare a mixture, 10 grams of acetylene carbon black powder (from Alfa Chemicals) was uniformly dispersed in 250 milliliters of xylene by ball-milling the mixture for 20 minutes. Subsequently, particulate of the carbon black powder was coated with 24% pitch in the same way as described in Example 1. A disk was made by pressing 0.4 grams of such pitch-coated carbon black powder in the same way as given in Example 1. The disk was carbonized at 710° C. Density of the disk was then measured to be 0.56 g/cc with porosity of 68%. Like matrices useful as catalyst bed and filters in many industrial applications, scanning electron microscopy images of cross-section micro-structures of the disk showed that all nano-scale carbon particles were interconnected with one another to form a highly porous matrix with uniform nano-scale pores between 10 and 50 nanometers.

Example 4

In the same way as described in Example 1, 20 grams of a calcined coke powder with an average particle size of 1 micrometer was coated with 15% pitch to provide pitch-coated coke particles. A 10% polymer binder solution was made with 10 grams of polyvinyl butyral (Butvar® B-79 by Solutia Inc.) dissolved in 90 grams of 50/50 toluene and methanol mixture. A mixture was prepared by mixing 5 grams of the particles with one gram of the polymer binder solution. Subsequently, 1 gram of the mixture was pressed with 5 tons of pressure in a die of 1.25 inches in diameter. A resulting disk was dried at 70° C. under vacuum for three hours and was then heated in a furnace under nitrogen gas at 850° C. The disk thereafter had a density of 1.1 g/cc and porosity of 40%. Scanning electron microscopy images of cross-section micro-structures of the disk showed a continuous and uniform pore structure. The polyvinyl butyral decomposed during heating leaving about 3% carbon residual in the disk, or less than 600 parts-per-million (ppm) in a total weight of the disk.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method, comprising:
    forming a shape of an article from particles separated from liquid of a suspension and provided by precipitation of pitch coatings onto solid cores dispersed in the suspension during the precipitation wherein lithium carbonate forms at least some of the solid cores; and
    carbonizing the pitch coatings by heating the particles formed into the shape to above 400° C. such that the particles interconnected with one another due to being formed into the shape are fixed together where the pitch coatings along adjoined ones of the particles contact one another and are carbonized to create the article; and
    further comprising removing the solid cores of the particles from the article to modify porosity of the article.

2. The method according to claim 1, wherein the forming of the article relies on the pitch coatings to achieve interconnection of the particles without adding binder material to the particles.

3. The method according to claim 1, wherein the forming the shape of the article includes pressing the particles together in a mold.

4. The method according to claim 1, wherein carbon content of the pitch coatings prior to the carbonizing is at least 50%, by weight.

5. The method according to claim 1, wherein the solid cores decompose during the carbonizing and at a temperature above a softening point of the pitch coatings.

6. The method according to claim 1, further comprising dissolving with a solvent the solid cores of the particles from the article once the pitch coatings are carbonized.

7. The method according to claim 1, further comprising controlling porosity of the article based at least in part on level of the pitch coatings on the solid cores.

8. The method according to claim 1, wherein level of the pitch coatings on the solid cores is between 5 and 50 percent by weight of the particles.

9. The method according to claim 1, wherein an average size of the particles is less than 1 millimeter.

10. The method according to claim 1, wherein void space between the particles generated with the forming and prior to the carbonizing contributes to porosity of the article.

11. A method, comprising:
    pressing a powder formed of particles having solid cores wherein lithium carbonate forms at least some of the solid cores that have a coating of pitch into a shape of an article with the particles interconnected from contact with one another under pressure; and
    carbonizing the pitch by heating the powder pressed into the shape of the article to above 400° C. such that the pitch from adjoined ones of the particles is carbonized to provide the article with a cohesive network of carbonized material; and
    further comprising removing the solid cores of the particles from the article to modify porosity of the article.

12. The method according to claim 11, wherein the pressing leaves void space between the particles contributing to porosity of the article.

13. The method according to claim 11, wherein the pressing is performed at a temperature above a softening point of the pitch so that voids among particles are filled with the pitch and the carbonizing converts the pitch to carbon providing the article with less than 10% porosity.

14. The method according to claim 11, further comprising mixing the powder with a polymer solution to form a mixture that is then mechanically forced into the shape during the pressing, wherein the carbonizing of the pitch with the heating to above 400° C. also decomposes the polymer.

* * * * *